US008147978B2

(12) United States Patent
Parkinson et al.

(10) Patent No.: US 8,147,978 B2
(45) Date of Patent: *Apr. 3, 2012

(54) COMPOSITION SUITABLE FOR SINGLE-SIDED, LOW-NOISE, STRETCH CLING FILM AND FILMS MADE THEREFROM

(75) Inventors: Shaun Parkinson, Tarragona (ES); Jesus Nieto, Cambrils (ES); Andreas Mayer, Wollerau (CH); Pascal E. R. E. J. Lakeman, Bergen op Zoom (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/786,106

(22) Filed: May 24, 2010

(65) Prior Publication Data

US 2010/0269455 A1   Oct. 28, 2010

Related U.S. Application Data

(63) Continuation of application No. 11/578,259, filed as application No. PCT/US2005/013467 on Apr. 19, 2005, now Pat. No. 7,740,950.

(60) Provisional application No. 60/563,483, filed on Apr. 19, 2004.

(51) Int. Cl.
*B32B 27/08* (2006.01)

(52) U.S. Cl. ........................................................ 428/515

(58) Field of Classification Search ........................ None
See application file for complete search history.

(56) References Cited

U.S. PATENT DOCUMENTS

| | | |
|---|---|---|
| 3,986,611 A | 10/1976 | Dreher |
| 4,050,221 A | 9/1977 | Lancaster, III et al. |
| 4,588,650 A | 5/1986 | Mientus et al. |
| 4,664,866 A | 5/1987 | van der Heijden et al. |
| 5,154,981 A | 10/1992 | Brant et al. |
| 5,175,049 A | 12/1992 | Huff et al. |
| 5,504,172 A | 4/1996 | Imuta et al. |
| 5,569,693 A | 10/1996 | Doshi et al. |
| 5,948,493 A | 9/1999 | Groeger |
| 5,976,682 A | 11/1999 | Eichbauer |
| 5,998,017 A | 12/1999 | Eichbauer |
| 6,093,480 A | 7/2000 | Eichbauer |
| 6,132,827 A | 10/2000 | Miro |
| 6,147,179 A * | 11/2000 | Somers .................... 526/348 |
| 7,740,950 B2 * | 6/2010 | Parkinson et al. ........... 428/515 |
| 2001/0014401 A1 | 8/2001 | Bonke et al. |
| 2002/0050124 A1 | 5/2002 | Jaeger |
| 2003/0194575 A1 | 10/2003 | Tau et al. |

FOREIGN PATENT DOCUMENTS

| | | |
|---|---|---|
| EP | 0612672 | 8/1994 |
| WO | 9515851 | 6/1995 |
| WO | 9912984 | 3/1999 |
| WO | 9914260 | 3/1999 |
| WO | 9914261 | 3/1999 |
| WO | 9955775 | 11/1999 |
| WO | 0001745 | 1/2000 |
| WO | 03040201 | 5/2003 |

OTHER PUBLICATIONS

Randall, Journal of Macromolecular Science. Reviews in Macromolecular Chemistry and Physics., vol. C29, Nos. 2 & 3, pp. 201-317, 1989.
Scholte et al., Journal of Applied Polymer Science, vol. 29, pp. 3763-3782, 1984.
Turi, Thermal Characterization of Polymeric Materials, 46-67, New York: Academic Press, 1981.
Otocka et al., Macromolecules, 4, 507, 1971.
Kirk-Othmer, The Encyclopedia of Chemical Technology, 3rd Ed., 416-417, vol. 16, New York: John Wiley & Sons, 1981.
Kirk-Othmer, The Encyclopedia of Chemical Technology, 3rd. Ed., 191-192, vol. 18, New York: John Wiley & Sons, 1981.
Weeks, Modern Plastics Encyclopedia, Mid-October Issue, 256-157, vol. 66, No. 11, McGraw-Hill, 1989.
Butler, Film Extrusion Manual: Process, Materials, Properties, 31-80, TAPPI: Atlanta, GA, 1992.

* cited by examiner

*Primary Examiner* — Sheeba Ahmed
(74) *Attorney, Agent, or Firm* — Whyte Hirschboeck Dudek SC

(57) ABSTRACT

The invention is directed to a composition suitable for use in a single-sided stretch cling film, the composition having from 0.1 to 20 percent by weight of a propylene-based copolymer having substantially isotactic propylene sequences, and having from 80 to 99 percent by weight of an ethylene-based copolymer having a density of at least 0.905 g/cc, wherein a film made from the composition exhibits cling layer to release layer cling of at least 70 grams force per inch as measured by ASTM D-5458-95, noise levels of less than 87 dB during unwinding operations, and has a modulus of at least 3 MPA as determined by ASTM D-882.

20 Claims, 7 Drawing Sheets

FILM PATH DIAGRAM

COMPOSITION SUITABLE FOR SINGLE-SIDED, LOW-NOISE, STRETCH CLING FILM AND FILMS MADE THEREFROM

CROSS-REFERENCE TO RELATED APPLICATION

This application is a continuation of U.S. patent application Ser. No. 11/578,259 filed on Oct. 12, 2006, now U.S. Pat. No. 7,740,950 which is a 371 of PCT/US05/13467 filed Apr. 19, 2005, which claims the benefit of U.S. Ser. No. 60/563,483 filed Apr. 19, 2004, the entire content of which is incorporated by reference herein.

FIELD

This invention pertains to thermoplastic compositions suitable for use in the manufacture of single-sided, stretch cling film exhibiting low-noise characteristics. More particularly, the invention pertains to polyolefin blends that can be used to manufacture low-noise, stretch cling films without the need of functional polymers or low molecular weight tackifiers. Additionally, the invention pertains to multilayer films incorporating the inventive composition in a cling layer of the film.

BACKGROUND

Single-sided stretch cling films are used by the packaging industry to over-wrap packages of goods, particularly they have been used to securely hold and/or wrap an article or group of articles, such as the use of an over-wrap film for the unitization of a pallet full of goods. In these applications, the films ideally should have high strength, be resistant to tear and puncture, and exhibit single-sided cling properties. The single-sided cling properties are important to prevent individual pallets' over-wrap from clinging to each other, which could result in tearing and/or destruction of the over-wrap and, ultimately, separation of goods from the pallet.

Generally, single-sided cling film is comprised of a cling layer and a release layer. The release layer does not have to have non-cling characteristics, but it does typically exhibit lower cling characteristics than the cling layer. The cling film is typically co-extruded with an A/B film layer structure. The cling layer typically comprises the A layer while the release layer typically comprises the B layer. In general, the cling force measured between two A layers of adjacent film structures and between the A layer of one film and the B layer of another film, is much greater than the cling force exhibited between the B layer of one film and the B layer of an adjacent film. Sometimes a third layer, C, is added to form an A/C/B film structure. In this type of film, the B is again the release layer and the C layer is a core layer that is used to obtain specific properties in the cling film and can consist of more than one physical layer. For example, if a higher modulus film is desirable, then the C layer may comprise a polymer that exhibits a higher modulus compared to the A or B layers.

Typically, the single-sided stretch cling film is wrapped around the goods to be unitized (such as cases of goods loaded on or to be loaded on a pallet), either using a hand applicator or a semi- or totally automated machine, in such a manner that a cling layer is laying over and adjacent to release layer of film. In most typical applications, the film needs to be stretched as it is applied to the goods in order to develop sufficient holding force for maintaining the integrity of the goods (such as a pallet of goods) to be unitized. This typically requires the single-sided stretch cling film to be capable of being stretched to 100%, often 200%, of its original length, while still maintaining its mechanical integrity and exhibiting adequate cling force between the cling layers and release layers where they contact.

In order to provide film structures providing adequate holding force, ethylene homopolymers and ethylene-based copolymers have been utilized (both hereinafter sometimes referred to as "polyethylene(s)). Polyethylene, having densities greater than 0.915 g/cc, provide adequate holding force, but they do not provide sufficient cling force for most applications. Therefore, the single-sided stretch cling films utilizing lower density polyethylene for the cling layer and higher density for the release layer have been developed. Unfortunately, for a film of a given overall thickness, a film using a lower density polyethylene in the cling layer and a higher density polyethylene in the release layer often has substantially lower holding force than a film made of just the higher density polyethylene. This will require a cling film having a larger thickness than desirable. Additionally, very low density polyethylene (having densities between 0.880 g/cc and 0.914 g/cc) are typically necessary to obtain the desired cling properties.

Single-sided stretch cling resins utilizing a polyethylene of sufficiently low density to provide adequate cling properties, often generate considerable noise as they are unwound from their supply roll in the process of wrapping the goods. In some cases, such as where extremely low density polyethylene is utilized, the noise generated may be in excess of that which can be safely tolerated for long-term exposure by the human ear. This is particularly problematic when the film is to be unwound by hand or using a semi-automated machine, because of the presence of personnel close to the supply roll.

As an alternative to films using very low density polyethylene for the cling layer, single-sided stretch cling films have been developed which utilize minor amounts of low molecular weight tackifiers. Common tackifiers include polybutylenes, mono- and diglycerides of fatty acids, low molecular weight amorphous polypropylenes, terpene resins and rosin esters.

These tackifiers tend to be migratory within the film and can cause die-lip build-up during film fabrication, and other undesirable accumulations on equipment during wrapping operations, that necessitate periodic stoppage of operations for cleaning and maintenance. Moreover, since they are migratory, they often migrate to adjacent and other films layers (and into the release layer of an adjacent film), thereby causing undesired adhesion and dirt retention problems commonly associated with two-sided cling film structures. Also, if the tackifiers migrate to the release layer of the film, it may result in one unitized pallet of goods to cling or drag against an adjacent unitized pallet thereby causing transportation and handling problems. Because of the cling nature imparted to the over-wrap by the migrated tackifier, one such over-wrapped pallet of goods may not readily slide against an adjacent pallet of goods. The tendency is for the over-wrap of one pallet to pull destructively upon the over-wrap of an adjacent pallet because of the cling nature imparted by migrated tackifier. This can be a problem in wholesale and retail goods distribution centers where pallets of goods are often moved about by fork lifts which can impart enough force to pull through the stretch over-wrap and destroy the integrity of the unitized pallet of goods.

Further, the tackifiers tend to be expensive and add to the cost of the overall film structure. The migratory tackifiers tend to be difficult to use for single-sided stretch cling film structures. Of particular concern, the migration of the tackifiers is subject to the duration of time since the film was made, the temperature under which the film was made and stored, the molecular characteristics (such as the molecular weight) of the base resin to which they are added, and the processing conditions utilized for over-wrapping the goods, such as winding tension. These result in films exhibiting widely divergent cling properties based on the properties present during their manufacture, storage and use. It also makes it difficult to use a single tackifier to manufacture a variety of different single-sided stretch cling films, of which each are designed to utilize different base polyethylene resin for the cling layer. Since the tackifiers are typically low molecular weight and amorphous, they can be difficult to handle in the context of typical thermoplastic film forming operations and can require specialized handling equipment, which adds to the complexity needs for manufacturing the single-sided stretch cling film. An additional layer can be provided between the cling and the release layer that comprises a thermoplastic resin that acts as a barrier to the migration of the tackifier. However, this additional layer further adds to the cost and complexity of manufacturing the film.

Single-sided stretch cling films have been disclosed wherein the cling layer comprises functionalized polymers, such as ethylene acrylate and/or ethylene vinyl acetate copolymers. While the functionalized polymers tend to improve the cling properties of the film, they also tend to be incompatible with the base resin making up the majority of the cling layer. This incompatibility can result in rheology matching problems in co-extrusions with polyethylene as well as thermal instability. Additionally, these functionalized polymers can lead to incompatibility problems during recycling of edge trim and film scrap generated during the film fabrication process. Further, the functionalized polymers are expensive and can greatly increase the cost for manufacturing the films.

What is desired is a composition that does not need to contain a migratory tackifier or functionalized polymers but, when incorporated into the cling layer of a single-sided stretch cling film, results in film that provides adequate cling properties, but also exhibits acceptably low noise when the film is unwound from film supply roll during over-wrapping operations. Additionally, it is desirable that the composition comprise at least 80 percent by weight of a polyethylene having a density of at least 0.905 g/cc. Further, it is desirable that the composition contains a non-migratory cling additive that will be useful for providing acceptable cling properties across a wide variety of different polyethylene base resins.

Objects Of The Invention

One object of the invention is to provide a composition useful for incorporation include the cling layer of a single-sided stretch cling film structure that can be manufactured with substantially reduced, or eliminated, die-lip build-up, and little or no accumulation of low molecular weight materials.

Another object of the invention is to provide a single-sided stretch cling film structure that can be manufactured with substantially reduced or eliminated die-lip build-up and accumulation of low molecular weight materials.

Still another object of the invention is to provide a single-sided stretch cling film comprising polymers with similar rheologies and monomer chemistries, thereby facilitating improved melt viscosity matching during co-extrusion of the film, and good polymer compatibility for recycling purposes.

A further object of the invention is to provide a single-sided stretch cling film which exhibits acceptable cling characteristics under stretched conditions and also generates acceptably low noise levels during over-wrapping operations.

Another further object of the invention is to provide a single-sided stretch cling film that incorporate polymers that can impart cling properties but don't exhibit migratory properties, hence showing more consistent cling performance over time.

Definitions

Single-sided stretch cling film: is a stretchable film having an outer layer exhibiting substantial cling properties. This layer is often referred to as the "cling" layer. The other outer layer of the film is the release layer. The release layer may exhibit some cling properties, but they are less than those exhibited by the cling layer. In general, the cling force measured between two cling (A) layers of adjacent film structures and between the cling (A) layer of one film and the release (B) layer of another film, is much greater than the cling force exhibited between the release (B) layer of one film and the release (B) layer of an adjacent film. The single-sided stretch cling film is typically wrapped around an article or group of articles to form a unitized package or "pallet." The unitized package is at least partially held together by the retaining force applied by over-wrap, which is stretched during the wrapping procedure. The package article or group of articles is typically wrapped so that the release layer of the film is located on the side of the film away from the article and the cling layer is located on the side of the film closest to the article.

SUMMARY

In a first embodiment, the invention is a composition suitable for use in a cling layer of a single-sided stretch cling film, the composition comprising:

A. from 0.1 to 20% by weight of a propylene-based copolymer having substantially isotactic propylene sequences, the propylene-based copolymer comprising propylene and from about 10 to about 33 mole % of units derived from an alpha olefin, the propylene-based copolymer having a melt flow rate less than 50 g/10 min; and B. from about 80 to about 99% by weight of a ethylene-based copolymer having a density of at least 0.905 g/cc, wherein a film made from the composition exhibits cling layer to release layer cling of at least 70 grams force per inch as measured by ASTM D-5458-95, noise levels of less than 87 dB during unwinding operations, and has a modulus of at least 3 MPA as determined by ASTM D 882.

In a second embodiment, the invention is a composition suitable for use in a cling layer of a single-sided stretch cling film, the composition comprising:

A. from 4 to 12% by weight of a propylene-based copolymer having substantially isotactic propylene sequences, the propylene-based copolymer comprising propylene and from about 10 to about 17 wt % of units derived from ethylene, the propylene-based copolymer having a melt flow rate from about 3 to about 18 g/10 min and exhibiting a heat of fusion of less than about 25 Joules/gram; and B. from about 88 to about 96% by weight of a ethylene/1-octene copolymer having a density of at least 0.917 g/cc and a melt index of from about 2 to about 12 g/10 min.

In a third embodiment, the invention is a single-sided stretch film, the film comprising:

A. a cling layer comprising:
(1) from 0.1 to 20% by weight of a propylene-based copolymer having substantially isotactic propylene sequences, the propylene-based copolymer comprising propylene and from about 10 to about 33 mole % of units derived from an alpha olefin, the propylene-based copolymer having a melt flow rate less than 50 g/10 min; and (2) from about 80 to about 99% by weight of a ethylene-based copolymer having a density of at least 0.905 g/cc; and B. a release layer comprising a polyethylene having a density of at least 0.905 g/cc, wherein the film exhibits a cling layer to release layer cling of at least 70 grams force per inch as measured by ASTM D-5458-95, noise levels of less than 87 dB during unwinding operations, and has a modulus of at least 3 MPA as determined by ASTM D-882.

DETAILED DESCRIPTION

Polyethylene for the Cling Layer

Figure 1:
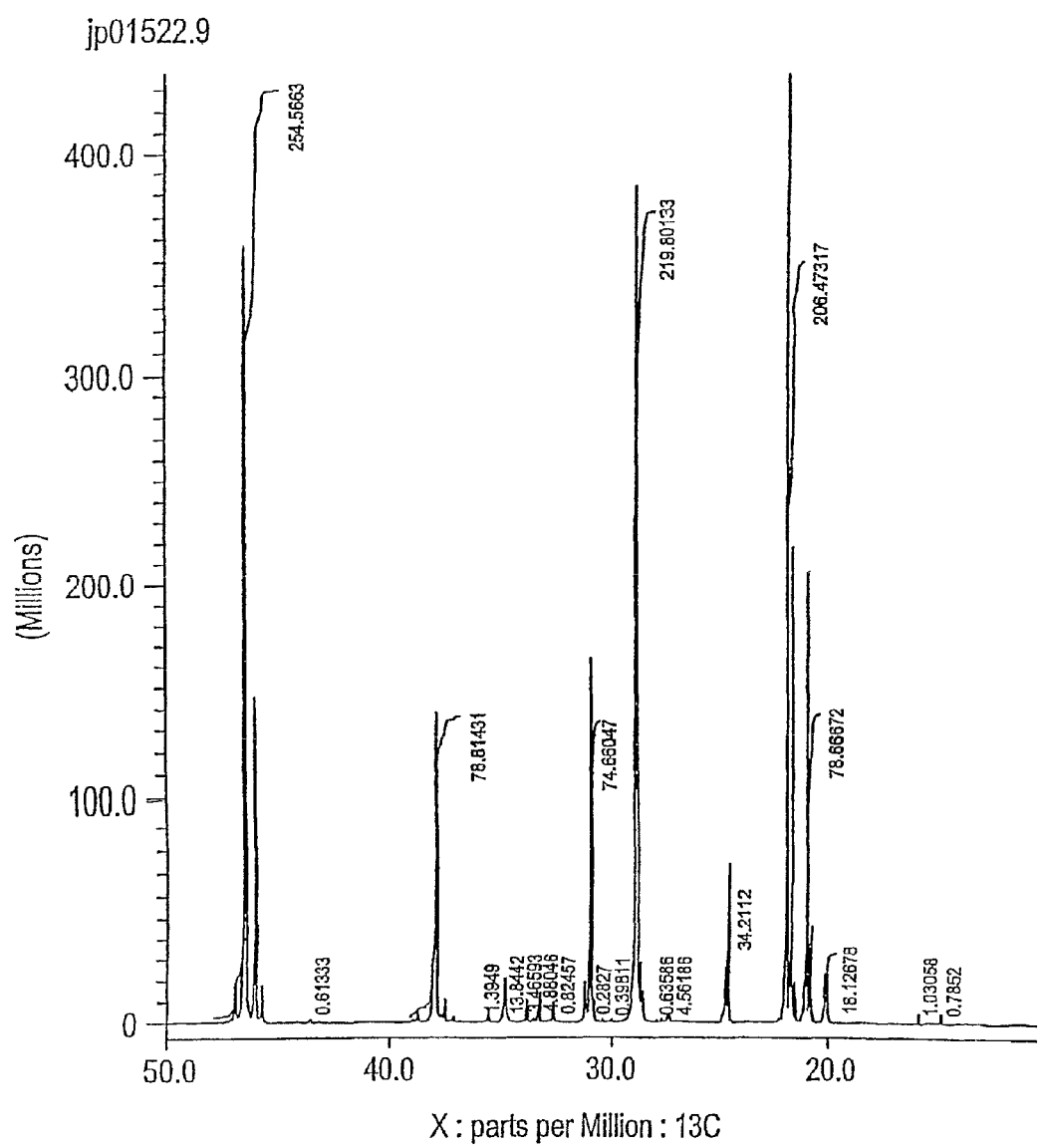
FIG. 1 shows the $^{13}$C NMR Spectrum of a propylene-ethylene copolymer (made with an activated non-metallocene, metal centered, heteroaryl ligand catalyst similar to Catalyst A), which is similar to the propylene-ethylene copolymers used in the Examples.

The polyethylene used in the cling layer preferably is a copolymer of units derived from ethylene and an alpha-olefin comonomer and preferably has a density of at least 0.905 g/cc, more preferably at least 0.910 g/cc, further more preferably at least 0.915 g/cc, most preferably at least 0.917 g/cc, and in some instances, such as where very high modulus films are desired, preferably at least 0.920 g/cc. The density of the polymers used in the current invention is measured in accordance with ASTM D-792.

The preferred alpha-olefin comonomers are C3 to C10 alpha-olefins, more preferably C4-C8 alpha-olefins, further more preferably C4, C5, C6 and C8 alpha-olefins, most preferably 1-butene, 1-hexene and 1-octene. Due to their superior film strength properties (such as tear resistance, puncture resistance, holding force and dart impact strength), the polyethylene copolymers preferably are linear polyethylenes made using gas phase, solution, or slurry polymer manufacturing processes, as known to one of ordinary skill in the art. Examples of polyethylenes useful for the cling layer are ethylene/1-octene substantially linear copolymers available from The Dow Chemical Company under the tradename "AFFINITY", ethylene/1-octene and ethylene/1-hexene linear copolymers available from The Dow Chemical Company under the tradename "DOWLEX", ethylene/1-octene linear copolymers available from The Dow Chemical Company under the tradename "ATTANE", ethylene/1-octene enhanced polyethylene available from The Dow Chemical Company under the tradename "ELITE", ethylene-based copolymers available from Polimeri Europa under the tradenames "CLEARFLEX" and "FLEXIRENE", ethylene/alpha-olefin copolymers available from ExxonMobil Chemical under the tradenames "Escorene", "Exact" and "Exceed", ethylene/alpha-olefin copolymers available from BP Petrochemicals under the tradename "INNOVEX", ethylene/alpha-olefin copolymers available from Basell under the tradenames "TUFLEXEN" and "LUPOLEX", ethylene/alpha-olefin copolymers available from DSM under the tradename "STAMYLEX", and ethylene/alpha-olefin copolymers available from Sabic under the tradename "LADENE.

The melt index ("MI") of the polyethylene useful in the cling layer depends upon the method contemplated to be used for manufacturing the single-sided stretch cling film. In general, the typical melt index is from 0.1 to 20 g/10 min. For films made using blown film manufacturing methods as known to one of ordinary skill in the art, the melt index preferably is from 0.3 to 9 g/10 min, more preferably from 0.5 to 6 g/10 min, most preferably from 1 to 3 g/10 min. For films made using cast film manufacturing methods as known to one of ordinary skill in the art, the melt index preferably is from 1 to 15 g/10 min, more preferably from 2 to 12 g/10 min, most preferably from 3 to 8 g/10 min. Melt index (MI) measurement is performed according to ASTM D-1238, Condition 190° C./2.16 kilogram (kg) weight, formerly known as "Condition E" and also known as I2. Melt index is inversely proportional to the molecular weight of the polymer. Thus, the higher the molecular weight, the lower the melt index, although the relationship is not linear.

Base Polymer for the Release Layer:

The polymer for the release (B) layer imparts to the film structure a release (sometimes referred to as "slip") surface. While any thermoplastic or blends thereof can be employed which will provide sufficient release properties, polyolefins preferably are utilized in this layer. More preferably, polyethylenes are utilized in this layer: For ease of handling, manufacture and recyclability, the polyethylene that is used in the release layer is the same or similar to the polyethylene used in the cling layer and, if used, the core (C) layer. This will be particularly useful for recycling of scrap. For single-sided stretch cling films having higher stretch force and modulus, polyethylene having a density of at least 0.917 g/cc preferably are utilized, more preferably at least 0.920 g/cc and in some instances preferably at least 0.925 g/cc.

Propylene-Based Copolymer:

The propylene-based copolymer comprises from 0.1 to 20 percent by weight of the total polymer composition capable of being utilized for the cling layer. Preferably, the propylene-based copolymer comprises from 1 to 15 percent by weight of the total composition, capable of being utilized for the cling layer, more preferably from 3 to 12 percent by weight of the total polymer composition, further more preferably from 4 to 12 percent by weight.

The propylene-based copolymer of the current invention is characterized as having substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra. NMR spectra are determined as described below.

The propylene-based copolymer of the invention have a melt flow rate (MFR) of less than 50 g/10 min which correlates to a weight average molecular weight (Mw) of greater than 100,000. It is believed that the combination of the relatively high isotacticity index, the relatively low melt flow rate (which corresponds to a relatively high weight average molecular weight), and preferably a crystallinity of at least 1 percent by weight (a heat of fusion of at least 1.65 Joules/gram), more preferably at least 2 percent by weight (a heat of fusion of at least 3.3 Joules/gram) result in the propylene-based polymer being non-migratory under most film processing conditions. This non-migratory nature will result in single-sided stretch cling film structures in which the cling properties of the cling layer are relatively constant over time and are not highly dependent on the processing conditions utilized to manufacture the film, or the conditions utilized for over-wrapping a group of goods to be unitized. Additionally, the non-migratory nature of the propylene-based copolymer will enable the polymer to be readily blended with a variety of polyethylenes and be incorporated into a variety of different film designs and still enable the single-sided stretch cling films to exhibit excellent cling properties and generate low noise when used in pallet over-wrapping operations.

In order to provide enhanced cling properties, the crystallinity preferably is less than 40 percent by weight (a heat of fusion of less than 69 Joules/gram), more preferably less than 30 percent by weight (a heat of fusion of less than 51 Joules/gram), further more preferably less than 15 percent by weight (a heat of fusion of less than 25 Joules/gram), and where handling is not a problem (i.e. sticky polymers can be utilized) preferably less than 7 percent by weight (a heat of fusion of less than 11 Joules/gram), even more preferably less than 5 percent by weight (a heat of fusion of less than 8.3 Joules/gram) determined in accordance with DSC method described below.

The propylene-based copolymer of the invention is comprised of units derived from propylene and from polymeric units derived from alpha-olefins. The preferred comonomers utilized to manufacture the propylene-based copolymer are C2, and C4 to C10 alpha-olefins, preferably C2, C4, C6 and C8 alpha-olefins, most preferably ethylene.

The propylene-based copolymer of the invention preferably comprises from 10 to 33 mole percent units derived from the alpha-olefin comonomer, more preferably from 13 to 27 mole percent units derived from the alpha-olefin comonomer. When ethylene is the comonomer, the propylene-based copolymer preferably comprises from 7 to 25 weight percent units derived from ethylene, more preferably from 9 to 20 weight percent units derived from ethylene, further more preferably from 10 to 17 weight percent units derived from ethylene, most preferably from 11 to 16 weight percent units derived from ethylene.

$^{13}$C NMR spectroscopy is one of a number of techniques known in the art of measuring comonomer incorporation into a polymer and measuring isotactic triad levels in propylene-based copolymers. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^1$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm.

For propylene-ethylene copolymers, the following procedure is used to calculate the mole percent ethylene in the polymer. Integral regions are determined as follows:

TABLE A

Integral Regions for Determining % Ethylene

| Region designation | PPM |
|---|---|
| A | 44-49 |
| B | 36-39 |
| C | 32.8-34 |
| P | 31.0-30.8 |
| Q | Peak at 30.4 |
| R | Peak at 30 |
| F | 28.0-29.7 |
| G | 26-28.3 |
| H | 24-26 |
| I | 19-23 |

Region D is calculated as D=P×(G×Q)/2. Region E=R+Q+(G×Q)/2.

TABLE E

Calculation of Region D

PPP = (F + A − 0.5 D)/2
PPE = D
EPE = C
EEE = (E − 0.5 G)/2

TABLE E-continued

Calculation of Region D

PEE = G
PEP = H
Moles P = sum P centered triads
Moles E = sum E centered triads
Moles P = (B + 2A)/2
Moles E = (E + G + 0.5B + H)/2

C2 values are calculated as the average of the two methods above (triad summation and algebraic) although the two do not usually vary. The weight percent of units derived from ethylene in the propylene-ethylene copolymers can be calculated from the values for mole percent ethylene by one of ordinary skill in the art.

In a particularly preferred aspect of the invention, the propylene-based copolymer utilized in the invention comprises a propylene-ethylene copolymer made using a nonmetallocene, metal-centered, heteroaryl ligand catalyst as described in U.S. patent application Ser. No. 10/139,786 filed May 5, 2002 (WO 03/040201), which is incorporated by reference herein in its entirety for its teachings regarding such catalysts. For such catalysts, the term "heteroaryl" includes substituted heteroaryl. An example of such a nonmetallocene, metal-centered, heteroaryl ligand catalyst is Catalyst A described in the Examples. The propylene-ethylene copolymers made with such nonmetallocene, metal-centered, heteroaryl ligand catalyst exhibit a unique regio-error. The regio-error is identified by $^{13}$C NMR peaks corresponding at about 14.6 and about 15.7 ppm, which are believed to be the result of stereo-selective 2,1-insertion errors of propylene units into the growing polymer chain. In this particularly preferred aspect, these peaks are of about equal intensity, and they typically represent about 0.02 to about 7 mole percent of the propylene insertions into the homopolymer or copolymer chain.

Figure 2:
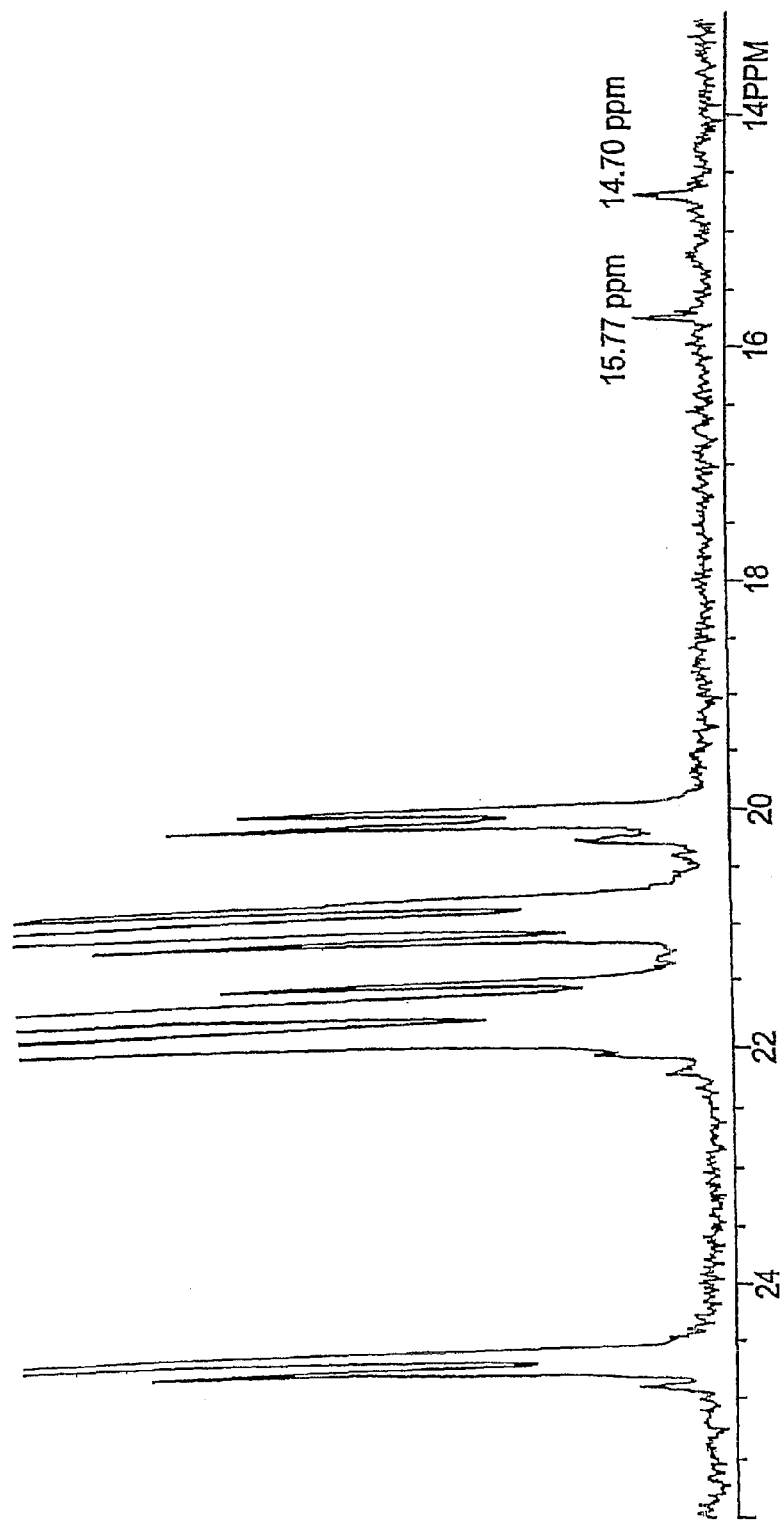
FIG. 2 shows the $^{13}$C NMR Spectrum of same propylene-ethylene copolymer as FIG. 1. However, the spectrum is shown with an expanded Y-axis scale relative to FIG. 1, in order to more clearly show the regio-error peaks at about 14.6 and 15.7 ppm.
Figure 3:
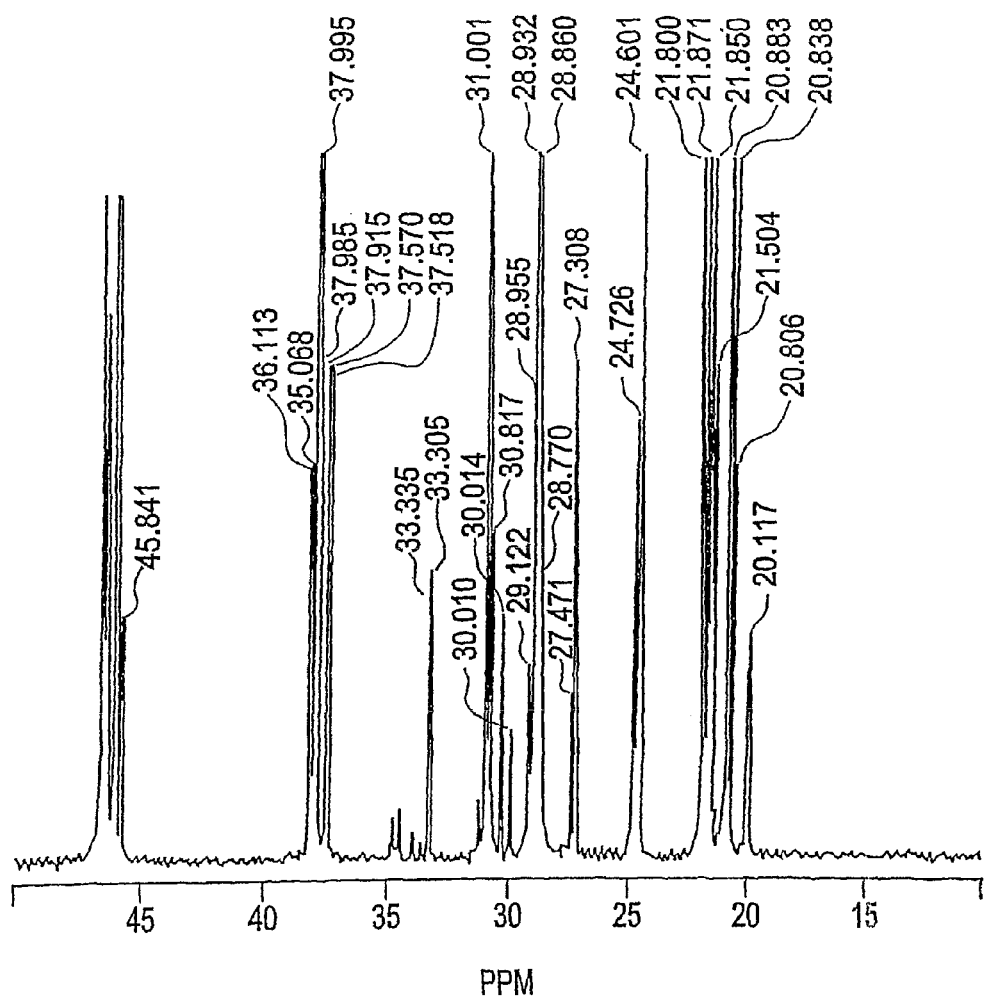
FIG. 3 shows the $^{13}$C NMR Spectrum of a propylene-ethylene copolymer prepared using a metallocene catalyst. The figure demonstrates the absence of regio-error peaks in the region around 15 ppm for a propylene-ethylene copolymer made with a metallocene catalyst.

A comparison of several $^{13}$C NMR spectra further illustrates the unique regio-errors of propylene-ethylene copolymers preferably utilized in the particularly preferred aspect of the invention. FIGS. 1 and 2 are the spectra of the propylene-ethylene copolymers similar to the propylene-ethylene copolymers utilized in the Examples. The spectrum of each polymer reports a high degree of isotacticity (isotactic triad (mm) measured by $^{13}$C NMR of greater than 0.94) and the unique regio-errors of these propylene-ethylene based copolymers. The $^{13}$C NMR spectrum of FIG. 3 is that of a propylene-ethylene copolymer prepared using a metallocene catalyst. This spectrum does not report the regio-error (at about 14.6 and about 15.7 ppm) characteristic of the most preferred propylene-ethylene copolymers used in this invention.

Isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For ethylene copolymers the mr region is corrected by subtracting 37.5-39 ppm integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art.

In some aspects of the invention, the propylene-based copolymer has a molecular weight distribution (MWD), defined as weight average molecular weight divided by number average molecular weight (Mw/Mn) of 3.5 or less.

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent propylene-ethylene copolymer molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\}=KM^a$$

where $K_{pp}$=1.90E-04, $a_{pp}$=0.725 and $K_{ps}$=1.26E-04, $a_{ps}$=0.702.

Differential Scanning Calorimetry

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of Polymeric Materials*, Academic Press, 1981). In the particularly preferred aspect of the invention, propylene-ethylene copolymers are utilized in the invention and are characterized by a DSC curve with a $T_{me}$ that remains essentially the same and a $T_{max}$ that decreases as the amount of unsaturated comonomer in the copolymer is increased. $T_{me}$ means the temperature at which the melting ends and $T_{max}$ means the peak melting temperature, both as determined by one of ordinary skill in the art from DSC analysis using data from the final heating step.

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The propylene-based copolymers samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. The resulting enthalpy curves are analyzed for peak melt temperature, onset and peak crystallization temperatures, heat of fusion and heat of crystallization, $T_{me}$, and any other DSC analyses of interest. The factor that is used to convert heat of fusion into nominal weight % crystallinity is 165 J/g=100 weight % crystallinity. With this conversion factor, the total crystallinity of a propylene-based copolymer (units: weight % crystallinity) is calculated as 100% times heat of fusion divided by 165 J/g.

The melt flow rate ("MFR") of the propylene-based copolymer useful for the cling layer depends upon the method contemplated to be used for manufacturing the single-sided stretch cling film. In general, the typical melt flow rate is from 0.1 to 50 g/10 min. For films made using blown film manufacturing methods as known to one of ordinary skill in the art, the melt flow rate preferably is from 0.5 to 12 g/10 min, more preferably from 1 to 10 g/10 min, most preferably from 2 to 9 g/10 min. For films made using cast film manufacturing methods as known to one of ordinary skill in the art, the melt flow rate preferably is from 2 to 25 g/10 min, more preferably from 3 to 18 g/10 min, most preferably from 5 to 12 g/10 min. Melt flow rate (MFR) measurement is performed according to ASTM D-1238, Condition 230° C./2.16 kilogram (kg) weight. As with the melt index, the melt flow rate is inversely proportional to the molecular weight of the polymer. Thus, the higher the molecular weight, the lower the melt flow rate, although the relationship is not linear.

Single-Sided Stretch Cling Film:

The single-sided stretch cling film of the present invention can be stretched by more than 100%, preferably by more than 200%, of its original, unstretched length, more preferably between 250 and 450%, as measured by ASTM D4649-03. The single-sided stretch cling film of the present invention exhibits cling layer-to-release layer cling of at least 70 grams-force per inch, preferably at least 80 grams-force per inch, more preferably at least 100 grams-force per inch, further more preferably at least 120 grams-force per inch, most preferably at least 150 grams-force per inch, and in some instances at least 200 grams-force per inch as measured in accordance with ASTM D-5458-95, which is a peel cling procedure where a one inch (25 mm) wide strip of film is adhered to a flat film attached to an inclined surface. The force required to remove the film strip from the flat film is measured. Cling values from the test are reported in grams-force per inch. The cling force of a cling layer of the single-sided stretch cling film of this invention to another cling layer of a similar film (of identical composition) preferably is between 150 grams-force per inch and 400 grams-force per inch. The single-sided stretch cling film of the present invention also generates peak noise levels of less than 87 dB, measured as described in the examples with a microphone located 10 cm from the unwinding 500 mm wide film rolls containing 23 micron thick film (with a background environmental noise level of 45 dB), and with a film unwinding speed of 110 meters/minute. Preferably, under these conditions the noise levels generated during unwinding operations is less than 85 dB, more preferably less than 83 dB, further more preferably less than 82 dB, most preferably less than 80 dB, and in some instances less than 79 dB.

The release layer exhibits less cling to itself than to the cling layer. In general, the cling of one release layer to another release layer is at most 60 grams-force per inch, preferably at most 20 grams-force per inch, as measured following ASTM D-5458-95 on an unstretched film. Preferably, the coefficient of friction of the release layer to itself is below 1, and is typically in the range of 0.15 to 0.7, preferably 0.25 to 0.5. A low coefficient of friction and non-cling behavior for the release layer is particularly desirable where products wrapped with the film may touch or slide against each other. Surprisingly, it has been discovered that a small amount of propylene-based copolymer may be incorporated into the release layer without unduly affecting the properties of the release layer and/or the interactions between the release layer and cling layer. In particular, up to 2% by weight of a propylene-based copolymer, preferably a propylene-ethylene copolymer made with a nonmetallocene metal-centered heteroaryl ligand catalyst as described above, may be incorporated into the release layer when it is desirable to enhance the cling properties between the cling layer and the release layer, while at the same time not unduly affecting the release properties.

The single-sided stretch cling film of the invention typically exhibits a machine direction ("MD") tensile strength from about 3 to 15 MPa., as measured by ASTM D-882. Preferably, the machine direction tensile strength is at least 6 MPa. more preferably at least 7 MPa further more preferably at least 8 MPa., most preferably at least 9 Mpa, and in some instances where tensile strength is particularly important (such as where extreme down gauging is desirable and/or where it is desirable to utilize a film which is capable of developing extreme holding forces) at least 15 MPa.

The multilayer single-sided stretch cling film of the present invention may be constructed from two or more film layers, including A/B and A/C/B type film structures by any film lamination and/or coextrusion technique and using any blown or cast film extrusion and lamination equipment known in the art. The preferred multilayer film structures are prepared using coextrusion techniques, and more preferably, by cast coextrusion techniques. For simplicity and ease of manufacture A/B type film structures are preferred. By convention for the invention, A will refer to the cling layer in A/B and A/C/B structures exemplified herein. The release layer will be designated by B.

If utilized, the C layer can comprise one or more additional layers that are utilized to modify some property or properties of the film structure, compared to the A/B film structure. In many commercial film structures the C layer/s is a main part of the entire film, typically it adds up to more than 30 percent by weight of the entire structure, more preferably 50 to 70 percent by weight and most preferably 60 to 90 percent by weight. In general, the materials chosen for core (C) layer(s) can have a great effect on the overall mechanical properties of the resulting single-sided stretch cling film. The polymers chosen for the core layer(s) are typically polyethylene polymers. If a higher stiffness film is desirable in order to develop greater holding force when stretched, then higher crystallinity ethylene copolymer (having a density of at least 0.917 g/cc, preferably at least 0.920 g/cc, more preferably at least 0.925 g/cc.) is utilized in the core layer. If a softer film is desirable, then lower crystallinity ethylene copolymers (having a density of from 0.88 to 0.915 is utilized in the core layer. The use of lower crystallinity copolymers for the core will also result in films with improved toughness and elasticity performance, but with lower holding force.

Since the C layer is encapsulated by the cling layer (A) and the release layer (B), a wide variety of polymers can be utilized in the core layer, which can be selected to improve selected properties of the film, without interfering with the cling and release properties of layers A and B. Also, the use of a core layer, will allow film trimming and scrap from the film fabrication process to be recycled back into the core layer, without adversely affecting the properties of the cling and release layers. For recycling purposes it is preferable to use the same or similar polyethylene resins in the A, B, and C layers.

Due to the inherent cling and non-cling properties of the individual layers of the single-sided stretch cling film of the invention, it is not necessary to include in the cling layer and non-cling layer additives such as low molecular weight tackifiers or slip and anti-block agents, to impart cling or non-cling characteristics. Preferably, the film is essentially free of such additives, thereby avoiding the problems commonly associated therewith. By "essentially free" of such additives we mean that the amounts of such additives, if present at all, is such that the cling or non-cling properties of the film are not appreciably changed. For instance, depending on the nature of the film, cling and/or anti-cling additives may be present in an amount of less than 500 ppm each based on the total weight of polymer in the film, and typically considerably less than this, for instance less than 100 ppm or less than 50 ppm based on the total weight of the polymers which comprise the film. An example of where a slip and/or anti-block additive may be present is when such additives are added to the propylene-based copolymer and/or polyethylene to reduce blocking of the polymer during shipment. In this type of scenario, the slip and/or anti-block additives will be present in the final film, but at the low levels described above.

In another less preferred aspect, anti-block and/or slip additives may be added to the release layer, in order to improve the release properties of the B layer. Non-limiting examples of anti-block additives include formulations based on $CaCO_3$ and/or $SiO_2$. Non-limiting examples of slip additives include formulations based on erucamide and/or oleamide. If added, these anti-block and/or slip additives should be at such a level that they do not adversely affect the cling properties of the cling layer to the release layer, as described herein.

In addition to anti-block and/or slip additives, other additives such as fillers (mineral particles, lithopone formulations), pigments ($TiO_2$ particles) and functional additives (for examples antistatic formulations) may be added to the release layer and/or to the core layer(s) to improve desirable properties of the film. These additional additives may also provide release properties to the release layer.

It may, however, be desirable to include in the single-sided stretch cling film of the invention additives which change other properties of the film, for example, antioxidants, free-radical scavengers, colorants, and other processing aids.

Suitable blown film processes are described, for example, in *The Encyclopedia of Chemical Technology*, Kirk-Othmer, Third Edition, John Wiley & Sons, New York, 1981, Vol. 16, pp. 416-417 and Vol. 18, pp. 191-192. A suitable cast extrusion method is described, for example, in Modern Plastics Mid-October 1989 Encyclopedia Issue, Volume 66, Number 11, pages 256 to 257. Suitable coextrusion techniques and requirements are described by Tom I. Butler in Film Extrusion Manual: Process, Materials, Properties, "Coextrusion", Ch. 4, pp. 31-80, TAPPI Press, (Atlanta, Ga. 1992).

The total film thickness of the multilayer film typically is from 0.4 to 2 mils (10 microns to 51 microns), preferably in the range of 0.6 to 1.5 mils (15 microns to 38 microns) and more preferably, in the range of 0.66 to 1.0 mils (17 microns to 25 microns).

The layer ratio for the A/B and the A/C/B multilayer films of this invention typically is from 1:5 to 5:1 ratio of A layer to B layer (A:B), preferably from 1:3 to 3:1 A:B, more preferably from 1.2:1 to 1:1.2 (A:B), and most preferably 1.1:1 to 1:1.1 (A:B).

The use of single-sided stretch cling films for the over-wrap packaging of goods, and in particular, the unitizing of pallet loads, is a significant commercial end use application. There are a variety of over-wrapping techniques which are employed utilizing such single-sided stretch cling films, including locating the pallet load to be wrapped atop a rotating platform. As the stretch wrap film is laid on about the girth of the pallet load, the pallet load is rotated on its platform. The single-sided stretch cling film is applied from a continuous film roll. Braking tension is applied to the continuous roll of film so that the film is being continuously stretched by the rotating pallet load. Usually the single-sided stretch cling film, located adjacent to the rotating pallet load, is vertically positioned and the rotating platform or turntable may be operated at speeds ranging from about 5 up to about 50 revolutions per minute. At the completion of the over-wrapping operation, the turntable is stopped while the film is cut and attached to the previous layer of film by employing tack sealing, adhesive tape, spray adhesives, pressure sealing, etc. Depending upon the width of the single-sided stretch cling film roll, the load being over-wrapped may be shrouded in the film while the vertically positioned film roll remains fixed in a vertical position, or the vertically positioned film roll (for example in the case of relatively narrow film widths and relatively wider pallet loads) may be arranged to move in a vertical direction as the load is being over-wrapped whereby a spiral wrapping effect is achieved on the packaged goods. Additional examples of pallet unitizing techniques are described in U.S. Pat. Nos. 3,986,611 and 4,050,221, which are incorporated by reference herein for their disclosures regarding pallet unitizing methods and techniques.

In addition to unitizing of pallet loads, additional uses for single-sided stretch cling films include: wrapping of silage bales and metal and paper reels, collation wrapping of cardboard and plastic trays and profiles made from wood, plastics and metals.

EXAMPLES

The polymers disclosed in the examples are the following:

P-E 1 is a propylene-ethylene copolymer made as described below, containing 12 percent by weight units derived from ethylene and having a melt flow rate of 8 g/10 min. This copolymer exhibits a heat of fusion of 21.5 Joules/gram, which corresponds to a crystallinity of 13 wt %, and a MWD of 3. This propylene-ethylene copolymer exhibited triad isotacticity (mm) of 0.96.

P-E 2 is a propylene-ethylene copolymer made as described below, containing 15 percent by weight units derived from ethylene and having a melt flow rate of 8 g/10 min. This copolymer exhibits a heat of fusion of 8.0 Joules/gram, which corresponds to a crystallinity of 5 wt %, and a MWD of 3. This propylene-ethylene copolymer exhibited triad isotacticity (mm) of 0.96.

DOWLEX SC2107 is an ethylene/1-octene copolymer having a melt index of 2.3 g/10 min and a density of 0.917 g/cc, which is available from The Dow Chemical Company.

CLEARFLEX CLDO is an ethylene/alpha-olefin copolymer having a melt index of 3 g/10 min and a density of 0.90 g/cc, which is available from Polimeri Europa.

Catalyst A

Synthesis of Catalyst A

Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-κ$N^1$,κ$N^2$]dimethyl-

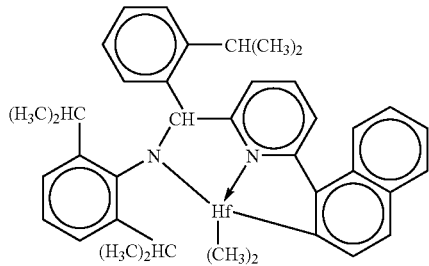

a) 2-Formyl-6-bromopyridine. This compound is synthesized according to literature procedures, *Tetrahedron Lett.*, (2001) 42, 4841.

b) 6-Bromo-2-(2,6-diisopropylphenyl)iminopyridine). A dry, 500 mL 3-neck round bottom flask is charged with a solution of 2-formyl-6-bromopyridine (72.1 g, 383 mmol) and 2,6-diisopropylaniline (72.5 g, 383 mmol) in 500 mL of anhydrous toluene containing 0.3 nm pore size molecular sieves (6 g) and 80 mg of p-TsOH. The reactor is equipped with a condenser, an over head mechanical stirrer and a thermocouple well. The mixture is heated to 70° C. under $N_2$ for 12 h. After filtration and removal of the volatiles under reduced pressure, a brown oil is isolated. Yield was 109 g, 81.9 percent.

GC/MS 346 ($M^+$), 331, 289, 189, 173, 159, 147, 131, 116, 103, 91, 78.

c) 6-(1-Naphthyl)-2-[(2,6-diisopropylphenyl)imino]pyridine. Naphthylboronic acid (54.5 g, 316 mmol) and $Na_2CO_3$ (83.9 g, 792 mmol) are dissolved into 200 mL of degassed 1:1 $H_2O$/EtOH. This solution is added to a toluene solution (500 mL) of 6-bromo-2-(2,6-diisopropylphenyl)-iminopyridine (109 g, 316 mmol). Inside of a dry box, 1 g (0.86 mmol) of tetrakis(triphenyl-phosphine)palladium(0) is dissolved in 50 mL of degassed toluene. The solution is removed from the dry box and charged into the $N_2$ purged reactor. The biphasic solution is vigorously stirred and heated to 70° C. for 4-12 hours. After cooling to room temperature, the organic phase is separated, the aqueous layer is washed with toluene (3×75 mL), the combined organic extracts are washed with $H_2O$ (3×200 mL) and dried over $MgSO_4$. After removing the volatiles under reduced pressure, the resultant light yellow oil is purified via recrystallization from methanol to give a yellow solid. Yield 109 g, 87.2 percent; mp 142-144° C.

$^1$H NMR (CDCl$_3$) δ 1.3 (d, 12H), 3.14 (m, 2H), 7.26 (m, 3H), 7.5-7.6 (m, 5H), 7.75-7.8 (m, 3H), 8.02 (m 1H), 8.48 (m, 2H).

$^{13}$C NMR (CDCl$_3$) δ 23.96, 28.5, 119.93, 123.50, 124.93, 125.88, 125.94, 126.49, 127.04, 127.24, 128.18, 128.94, 129.7, 131.58, 134.5, 137.56, 137.63, 138.34, 148.93, 154.83, 159.66, 163.86.

GC/MS 396 ($M^+$), 380, 351, 337, 220, 207, 189, 147.

d) 2-Isopropylphenyl lithium. Inside an inert atmosphere glovebox, n-butyl lithium (52.5 mmol, 21 mL of 2.5M in hexanes) is added by addition funnel over a period of 35-45 min to an ether solution (50 mL) of 2-isopropyl bromobenzene (9.8 g, 49.2 mmol). After the addition is complete, the mixture is stirred at ambient temperature for 4 h. Then, the ether solvent is removed under vacuum overnight. The next day hexane is added to the remaining white solid and the mixture filtered, washed with additional hexane, and then vacuum dried. 2-Isopropylphenyl lithium (4.98 g, 39.52 mmol) is collected as a bright white powder. A second crop of product (0.22 g) is later obtained from a second filtration of the original hexane filtrant.

$^1$H NMR (d$_8$-THF) δ 1.17 (d, J=6.8 Hz, 6H), 2.91 (sept, J=6.8, 1H), 6.62-6.69 (multiplets, 2H), 6.77 (d, J=7.3 Hz, 1H), 7.69 (multiplet, 1H).

$^{13}$C NMR (d$_8$-THF) δ 25.99, 41.41, 120.19, 122.73, 122.94, 142.86, 160.73, 189.97.

e) 2-pyridinemethanamine, N-[2,6-bis(1-methylethyl)phenyl]-α-[2-(1-methylethyl)phenyl]-6-(1-naphthanlenyl). The imine, 6-(1-naphthyl)-2-[(2,6-diisopropylphenyl)imino]pyridine of step c) (2.20 g, 5.6 mmol) is magnetically stirred as a slurry in 60-70 mL of dry ether under a nitrogen atmosphere. An ether solution of 2-isopropylphenyl lithium (1.21 g, 9.67 mmol in 25 mL dry ether) is added slowly using a syringe over a period of 4-5 min. After the addition is complete, a small sample is removed, quenched with 1N NH$_4$Cl and the organic layer analyzed by high pressure liquid chromatography (HPLC) to check for complete consumption of starting material. The remainder of the reaction is quenched by the careful, slow addition of 1N NH$_4$Cl (10 mL). The mixture is diluted with more ether and the organic layer washed twice with brine, dried (Na$_2$SO$_4$), filtered, and stripped of solvent under reduced pressure. The crude product obtained as a thick red oil (2.92 g; theoretical yield=2.87 g) is used without further purification.

$^1$H NMR (CDCl$_3$) δ 0.96 (d, J=6.6 Hz, 3H), 1.006 (d, J=6.8 Hz, 3H), 1.012 (d, J=6.8 Hz, 6H), 1.064 (d, J=6.8 Hz, 6H), 3.21-3.34 (multiplets, 3H), 4.87 (br s, NH), 5.72 (s, 1H), 6.98 (d, J=7.6 Hz, 1H) 7.00-7.20 (multiplets, 7H), 7.23-7.29 (multiplets, 4H), 7.51 (d, J=7.1 Hz 1H), 7.60-7.65 (multiplets, 2H), 7.75 (multiplet, 1H), 8.18 (multiplet, 1H).

$^{13}$C NMR (CDCl$_3$) δ 23.80, 24.21, 24.24, 24.36, 28.10, 28.81, 67.08, 120.20, 122.92, 123.96, 124.42, 125.35, 125.81, 126.01, 126.28, 126.52, 126.58, 126.65, 127.80, 128.52, 128.62, 129.25, 131.82, 134.52, 136.81, 138.82, 140.94, 143.37, 143.41, 146.66, 159.05, 162.97.

f) Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-κ$N^1$,κ$N^2$]dimethyl- A glass jar is charged with 8.89 mmol of the ligand from step e) dissolved in 30 mL toluene. To this solution is added 8.98 mmol of n-BuLi (2.5 M solution in hexanes) by syringe. This solution is stirred for 1 hour, then 8.89 mmol of solid HfCl$_4$ are added. The jar is capped with an air-cooled reflux condenser and the mixture is heated at reflux for 1 hour. After cooling, 31.1 mmol of MeMgBr (3.5 equivalents, 3.0 M solution in diethyl ether) are added by syringe and the resulting mixture stirred overnight at ambient temperature. Solvent (toluene, hexanes and diethyl ether) is removed from the reaction mixture using a vacuum system attached to the drybox. Toluene (30 mL) is added to the residue and the mixture filtered, and the residue (magnesium salts) is washed with additional toluene (30 mL). Solvent is removed by vacuum from the combined toluene solution, and hexane is added, then removed by vacuum.

Hexane is again added and the resulting slurry is filtered and the product washed with pentane to give the desired product as a yellow powder.

$^1$H NMR (C$_6$D$_6$): δ 8.58 (d, J=7.8 Hz, 1H), 8.25 (d, J=8.4 Hz, 1H), 7.82 (d, J=7.5 Hz, 1H), 7.72 (d, J=6.9 Hz, 1H), 7.50 (d, J=8.1 Hz, 1H), 7.36-7.27 (multiplets, 3H), 7.19-6.99 (multiplets, 7H), 6.82 (t, J=8.1 Hz, 1H), 6.57 (s, 1H), 6.55 (d, J=7.8 Hz, 1H), 3.83 (septet, J=6.9 Hz, 1H), 3.37 (septet, J=6.9 Hz, 1H), 2.89 (septet, J=6.9 Hz, 1H), 1.38 (d, J=6.6 Hz, 3H), 1.37 (d, J=6.9 Hz, 3H), 1.17 (d, J=6.9 Hz, 3H), 1.15 (d, J=7.2 Hz, 3H), 0.96 (s, 3H), 0.70 (s, 3H), 0.69 (d, J=5.4 Hz, 3H), 0.39 (d, J=6.9 Hz, 3H).

General Continuous Loop Solution Propylene-Ethylene Copolymerization Procedure

The propylene-ethylene copolymers of Examples 1-24 (P-E 1, P-E 2, and P-E 3) are made according to the following procedure. Catalyst A is used to manufacture all the propylene-ethylene copolymers of Examples 1-24.

The polymerization process is exothermic. There are ~900 BTU released per pound of propylene polymerized and ~1,500 BTU released per pound of ethylene polymerized. The primary process design consideration is how to remove the heat of reaction. The propylene-ethylene copolymers of Examples 1-24 are produced in a low-pressure, solution polymerization loop reactor, made up of a 3" loop pipe plus two heat exchanges, the total volume of which is 31.4 gals. Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentrations equal to 18 wt %. The adiabatic temperature rise of the solution accounts for some of the heat removal from the polymerization reaction. Heat exchangers within the reactor are utilized to remove the remaining heat of reaction, allowing for reactor temperature control at 105° C.

The solvent used is a high purity iso-paraffinic fraction purchased from Exxon called Isopar E. Fresh propylene is passed through a bed of Selexsorb COS for purification before mixing with the recycle stream (contains solvent, propylene, ethylene, and hydrogen). After mixing with the recycle stream, the combined stream is passed through a bed of 75 wt % Molecular Sieve 13× and 25 wt % Selexsorb CD for further purification before using a high pressure (700 psig) feed pump to pump the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to the appropriate feed temperature (5° C.). The reactor operates at 525 psig and a control temperature equal to 105° C. The propylene conversion in the reactor is maintained by controlling the catalyst injection rate. The reaction temperature is maintained by controlling the water temperature across the shell side of the heat exchanger at 85° C. The residence time in the reactor is short, 10 minutes. The propylene conversion per reactor pass is 60 wt %.

Upon exiting the reactor, water and additive are injected into the polymer solution. The water hydrolyzes the catalyst, terminating the polymerization reaction. The additives consist of antioxidants, 500 ppm of Irganox™ 1010 and 1000 ppm of Irgafos™ 168, that remain with the polymer and act as stabilizers to prevent polymer degradation while in storage before subsequent fabrication at the end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

Blending of the Cling Layer Components:

The compositions incorporated into the cling layer can be made by: (a) dry Blending of the component pellets; (b) direct feeding of the component pellets via a blender system (volumetric or gravimetric) mounted on an extruder; (c) compounding the pellet components in a compounding extruder producing pellets of compounded product; and/or (d) any other blending techniques known to one of ordinary skill in the art.

Examples 1-2

The multilayer single-sided stretch cling films of Examples 1 and 2 are prepared using Dowlex SC2107 as the release layer (layer B), Dowlex SC2107 as the core layer (layer C) and a blend of Dowlex SC2107 and a propylene-ethylene copolymer (P-E 1 or P-E 2) in the cling layer (layer A). The percent by weight of Dowlex SC2107 and propylene-ethylene copolymer utilized for the cling layer is set forth in Table 1. The cast co-extrusion film equipment utilized to prepare these single-sided stretch cling films consists of a three extruder configuration: a 75 mm diameter 30 L/D Primplast extruder ("C" core layer) with two 30:1 L/D 55 mm diameter Primplast satellite extruder ("A and B" cling layer and release layer). The molten polymer exits the extruders through an A/C/B feedblock into a 790 mm Er-We-Pa, flat film die. In manufacturing the films, the pumping rates of the extruders are adjusted to maintain a 15 percent/70 percent/15 percent layer thickness ratio as molten polymer is fed through a 0.020 inch (0.05 cm) die gap. The co-extruded films contact two chill rolls cooled to 70° F. (21° C.) at an air/draw gap of 5 inches (12.7 cm).

The cast co-extruded film samples are conveniently produced at a nominal total film thickness of 0.9 mil (23 microns), a melt temperature of approximately 482° F. (250° C.) for the A layer and 482° F. (250° C.) for B and C layers, and a line speed of 820 feet per minute (250 meters per minute). The resultant film has an unstretched release layer-to-cling layer cling value of ~200 grams-force per inch according to ASTM D-5458-95. The resultant inventive films also exhibit acceptable cling values when the films are stretched to approximately 200 percent of their original length and tested in accordance with ASTM D-5458-95.

Comparative multilayer single-sided stretch cling films (CS-1 and CS-2) are made in the same manner as the inventive films using the materials indicated in Table 1.

During the fabrication process, the films of Examples 1 and 2 exhibit excellent extrusion processability, with no die-lip build-up observable during a 2-hour fabrication trial.

TABLE 1

| Example | Layer A | Layer B | Layer C |
|---|---|---|---|
| 1 | 90 wt % Dowlex SC2107 + 10 wt % P-E 1 | Dowlex SC2107 | Dowlex SC2107 |
| 2 | 95 wt % Dowlex SC2107 + 5 wt % P-E 2 | Dowlex SC2107 | Dowlex SC2107 |
| CS1 | Dowlex SC2107 70 wt % + Polimeri CLDO 30 wt % | Dowlex SC2107 | Dowlex SC2107 |
| CS2 | Dowlex SC2107 | Dowlex SC2107 | Dowlex SC2107 |

The cling films of Examples 1-2, and CS 1 and 2 are tested for cling properties in accordance with ASTM D 5458-95, Test Methods for Peel Cling of Stretch Wrap Film. The films are tested, release layer-to-cling layer cling. The values for cling are reported in Table 2 as the force in grams per inch width (g-force/inch) required to remove a film strip, one inch wide, from a flat film surface.

In order to determine the cling layer-to-release layer cling values (reported in Tables 2 and 4), a 1 inch (Transverse Direction) by 7 inch (Machine Direction) (25 mm by 178 mm) strip of film is cut and attached to a 20 degree inclined plane with the release layer facing upward. A second, unstretched 1 inch by 7 inch strip of film is placed on top of the first strip with the cling layer facing downward. Sufficient pressure is applied with a brush to cause the two strips to adhere together. The end of the second strip at the base of the include plane is attached, by a clip and a string, to an apparatus which can exert a strain at a constant rate, such as an Instron Tensile Tester. The two strips are separated at a crosshead speed of 5 inches per minute (13 centimeters/minute) until the attached string is parallel with the base of the inclined plane. The value for cling is determined at the moment when the 25.4 mm (1.0-in) film specimen is separating from the incline at the horizontal cling line marked upon the incline face. The cling level, by convention, is reported in Tables 2 and 4 in units of grams force per inch. In order to determine stretched cling values, the procedure is repeated with fresh film samples and is carried out as described above, except the lower film is stretched to 200 percent its original length prior to being attached to the included plane. In general, stretched cling values are appreciably less than un-stretched cling values.

Single-sided stretch cling films corresponding to the films of Examples 1 and 2 are tested for noise generation during the unwinding of film rolls that occurs during film over-wrapping operations carried-out in accordance with the following method.

Procedure to Measure the Unwinding Noise Level with a Highlight Tester

Figure 7:
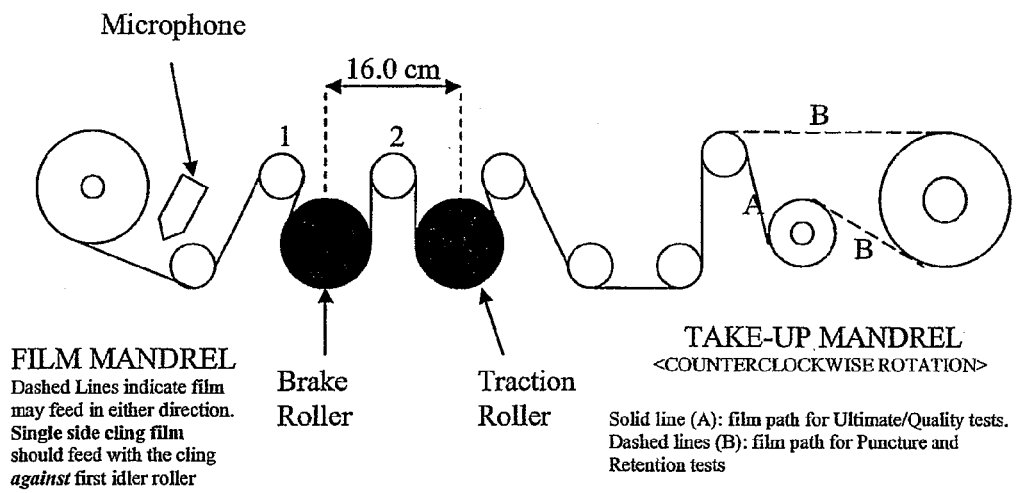
FIG. 7 is a simplified depiction of an apparatus useful for measuring the unwinding noise levels generated by a cling film.

Referring to FIG. 7, the test consists of stretching a 500 mm wide, 23 micron thick single-sided cling film at a target elongation (pre-set stretch) of 200%. The stretching takes place between the Brake roller and a Traction roller that are separated so that the stretching of the film takes place over a 16.0 cm distance. Stretch film is obtained by running the traction roller at a higher rpm than the brake roller. The machine measures sequentially, each second, stretching force and noise level. The film unwinding speed is 110 meters per minute and the noise levels are measured with a microphone located tangentially to the film roll at 10 cm from the film roll. The background environmental noise is 45 dB.

The Noise meter utilized is a QUEST TECHNOLOGIES, Model 2700.

Unwinding force is measured with a load cell placed on the roller #1. Stretch force is measured with a load cell placed on roller #2.

TABLE 2

| Example | | 1 | 2 | CS1 | CS2 |
|---|---|---|---|---|---|
| Cling | g-force/inch | 198.4 | 201.6 | 106.5 | 55 |
| Average thickness | μ | 23 | 23 | 23 | 23 |
| Maximum Stretch | % | 266 | 281 | 279 | 260 |
| Maximum Stretch Force | Kg | 36.7 | 36.7 | 35.7 | 35 |
| Maximum Unwind force | Kg | 3.1 | 2 | 1.6 | 1 |
| Average Stretch | % | 203 | 207 | 193 | 200 |
| Average Stretch Force | Kg | 30.2 | 30.5 | 29.3 | 30 |
| Pre-set stretch | % | 200 | 200 | 200 | 200 |
| Sound level | Db | 78.4 | 78.2 | 78.4 | * |
| MD Tensile Strength by ASTM D882 | MPa | 9 | 9 | 9 | 9 |

The data in Table 2 demonstrates that films prepared using the anti-cling composition of the present invention exhibit substantial cling while also exhibiting low noise generation during over-wrapping operations. Surprisingly, single-sided stretch cling films made in accordance with the current invention exhibited cling of greater than 150 grams-force per inch, while also generating less than 80 dB of noise. Additionally, the films provide these benefits while at the same time being able to develop excellent holding force (as exhibited by the high values of machine direction (MD) tensile force). The high tensile forces exhibited will enable the films of the invention to effectively unitize various products. Also, the excellent holding forces exhibited by the inventive films will allow for the thickness of the film to be down-gauged, while still providing adequate holding forces. The measured cling properties develop relatively quickly as the film is being produced, and, unlike migratory cling additives, is consistent over time, as the film is further processed & handled.

Examples 3-8

Single-sided stretch cling films of Examples 3-8 are made using the same methods described above for the films of Examples 1 and 2. The multilayer single-sided stretch cling films of Examples 3-8 have A/C/B structures as described for the films of Examples 1 and 2, except that the film of Example 8 use an A/C/B structure having weight ratios of 10 percent/80 percent/10 percent layer thickness ratio for the respective layers. Table 3 sets forth the polymers utilized in the various layers of the film and the respective amounts of each polymer used.

TABLE 3

| Example | Layer A | Layer B | Layer C |
|---|---|---|---|
| 3 | 99 wt % Dowlex SC2107 + 1 wt % P-E 2 | Dowlex SC2107 | Dowlex SC2107 |
| 4 | 97 wt % Dowlex SC2107 + 3 wt % P-E 2 | Dowlex SC2107 | Dowlex SC2107 |
| 5 | 95 wt % Dowlex SC2107 + 5 wt % P-E 2 | Dowlex SC2107 | Dowlex SC2107 |
| 6 | 93 wt % Dowlex SC2107 + 7 wt % P-E 2 | Dowlex SC2107 | Dowlex SC2107 |
| 7 | 91 wt % Dowlex SC2107 + 9 wt % P-E 2 | Dowlex SC2107 | Dowlex SC2107 |
| 8 | 91 wt % Dowlex SC2107 + 9 wt % P-E 1 | Dowlex SC2107 | Dowlex SC2107 |

The single-sided stretch cling films of Examples 3-8 are tested for noise and cling levels in accordance with the procedures described above for Examples 1-2. The noise and cling levels and other properties exhibited by the films of Examples 3-8 are listed in Table 4.

TABLE 4

| Example | | 3 | 4 | 5 | 6 | 7 | 8 |
|---|---|---|---|---|---|---|---|
| Cling | g-force/inch | 99 | 106 | 153 | 160 | 205 | 96 |
| Average thickness | μ | 23 | 23 | 23 | 23 | 23 | 23 |
| Maximum Stretch | % | * | * | * | * | * | * |
| Maximum Stretch Force | Kg | * | * | * | * | * | * |
| Maximum Unwind force | Kg | * | * | * | * | * | * |
| Average Stretch | % | * | * | * | * | * | * |
| Average Stretch Force | Kg | * | * | * | * | * | * |
| Pre-set stretch | % | 200 | 200 | 200 | 200 | 200 | 200 |
| Sound level | Db | 79 | 79 | 79 | 79 | 80 | 79 |
| MD Tensile Strength by ASTM D882 | | 9 | 9 | 9 | 9 | 9 | 9 |

* The values are not measured, but are expected to be the same as or similar to the values measured for Examples 1 and 2.

Figure 4:
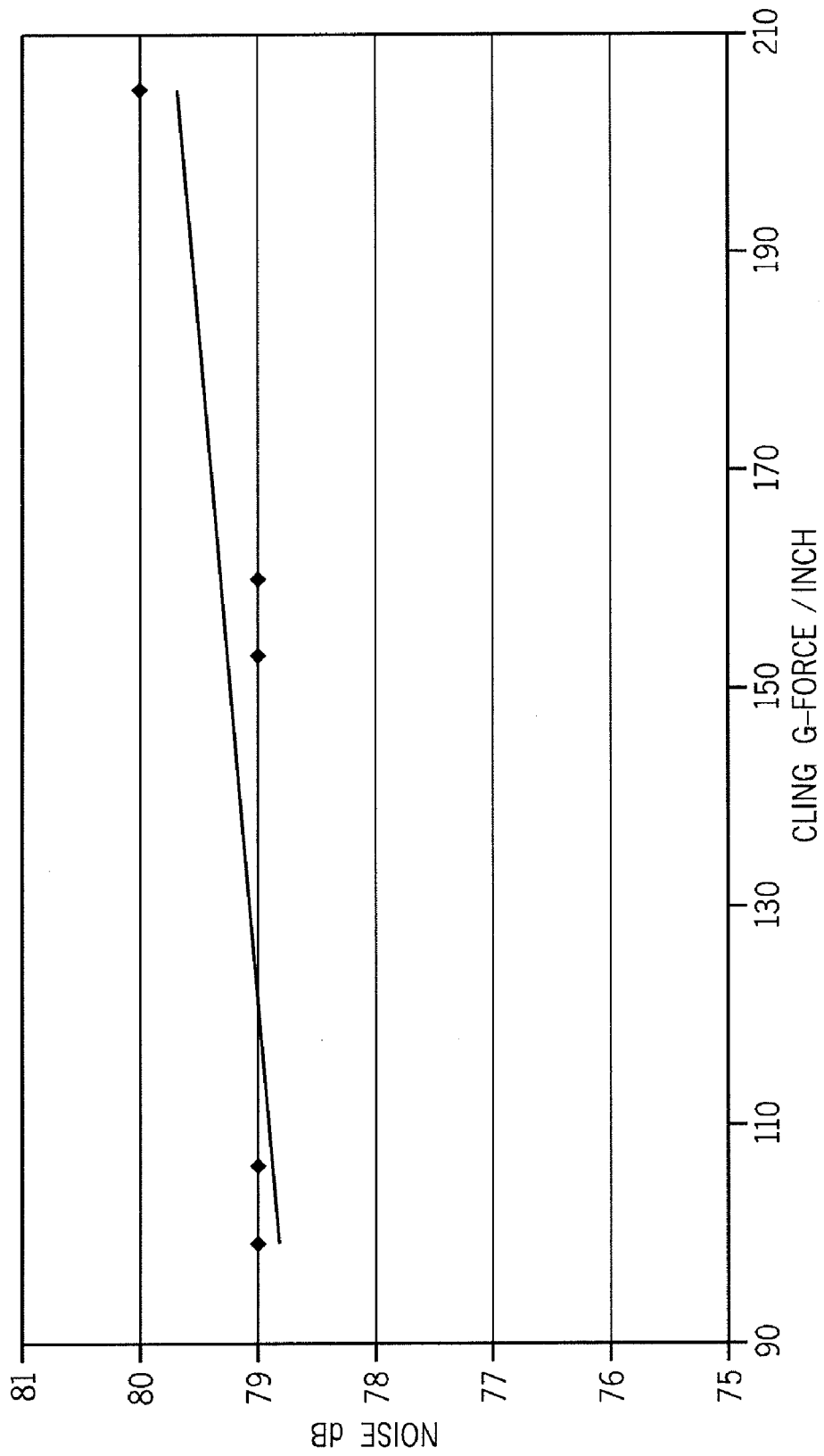
FIG. 4 is a graphical depiction showing the noise versus cling levels exhibited by the single-sided stretch cling films of Examples 3 through 7.

The cling level and noise generation data of Examples 3-7 are depicted graphically in FIG. 4. FIG. 4 clearly shows that single-sided stretch cling films made in accordance with the invention exhibit relatively high cling levels, while at the same time generating acceptably low noise. Surprisingly and unexpectedly, for cling levels of between 100 g-force/inch and 205 g-force/inch, the single-sided stretch cling films of the invention generated approximately the same amount of noise during unwinding of the film rolls for over-wrapping operations. Additionally, Examples 3 through 8 show that films of the invention exhibit excellent cling and noise characteristics, even when very low levels of propylene ethylene copolymers are utilized.

Examples 1 and 8 demonstrate that when the propylene-ethylene copolymer utilized in the cling layer is a copolymer having 12 percent by weight units derived from ethylene, the cling force exhibited by the film can be significantly improved, by using a cling layer comprising 15% of the film structure (Example 1) versus 10% of the film structure (Example 8). Preferably, when a propylene-ethylene copolymer is used which has less than 15 wt % units derived from ethylene and it is desirable that the film exhibit at least 120 grams force per inch cling, then the cling layer should make up at least 12 percent of the film thickness, more preferably at least 13 percent, further more preferably at least 14 percent, and most preferably at least 15 percent of the overall film structure thickness. Also, if it is desirable to utilize a film structure, wherein the cling layer makes up less than 13 percent of the film thickness, then a propylene-ethylene copolymer having at least 14 wt % units derived from ethylene preferably is utilized, more preferably a propylene-ethylene copolymer having at least 15 wt % units derived from ethylene.

Examples 9-13

Figure 5:
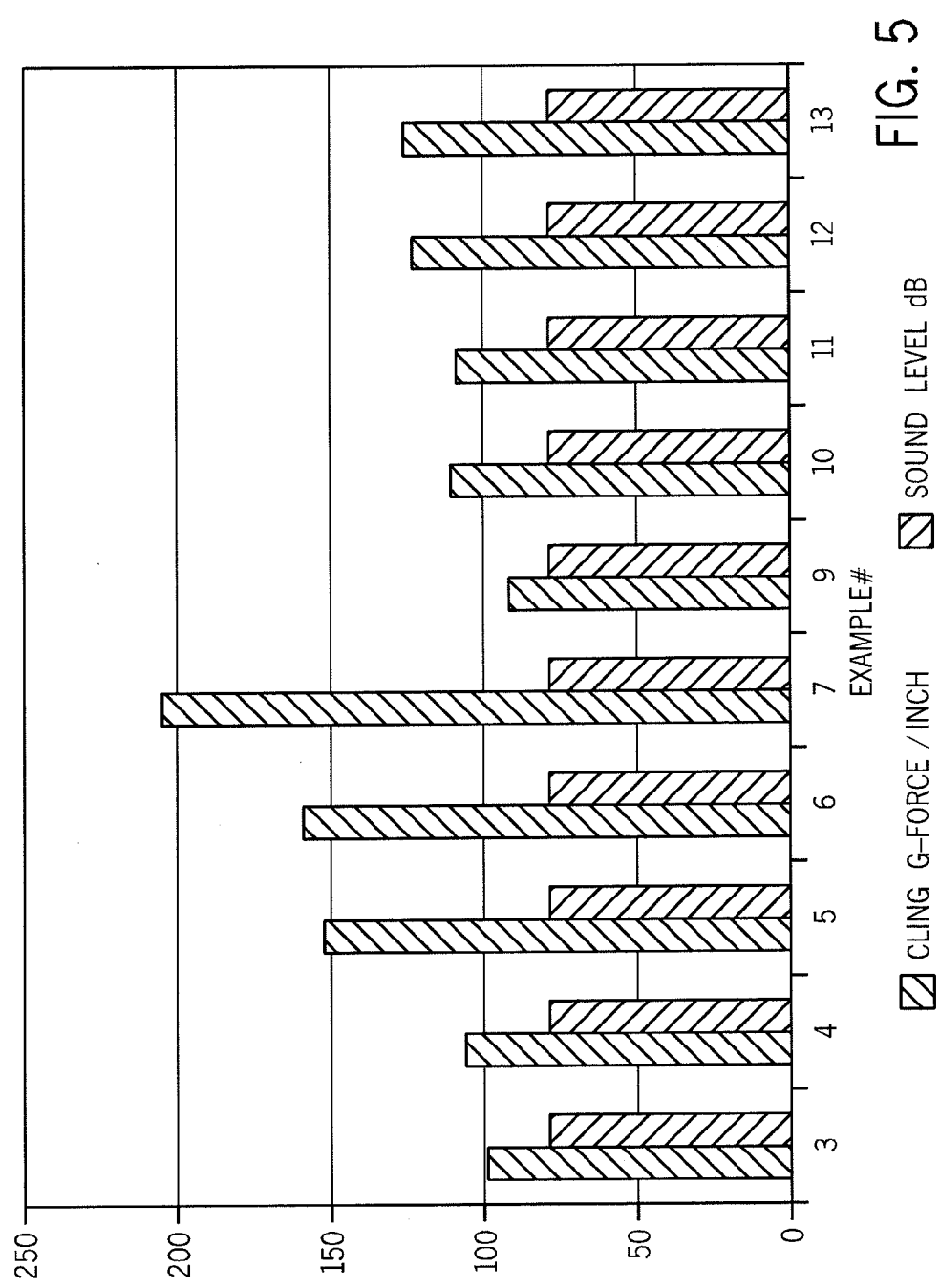
FIG. 5 is a graphical depiction showing the noise and cling levels exhibited by the single-sided stretch cling films of Examples 3 through 13.

Single-sided stretch cling films of Examples 9-13 are made using the same methods described above for the films of Examples 1 and 2. The multilayer single-sided stretch cling films of Examples 9-13 have A/C/B structures as described for the films of Examples 1 and 2 and were tested for cling layer to release layer cling and unwinding noise as described for the films of Examples 1 and 2. Table 5 sets forth the polymers utilized in the various layers of the film and the respective amounts of each polymer utilized. The cling strength values and unwind noise levels exhibited by the films are depicted in FIG. 5. The tensile strength and other properties listed in Table 1 were not measured for these films, but are expected to be the same or similar to the values measured for Examples 1 and 2.

As can be seen from FIG. 5, even at low levels of propylene-ethylene copolymer, the films exhibit excellent cling strength/unwinding noise balance of properties.

TABLE 5

| Example | Layer A | Layer B | Layer C |
|---|---|---|---|
| 9 | 99 wt % Dowlex SC2107 + 1 wt % P-E1 | Dowlex SC 2107 | Dowlex SC 2107 |
| 10 | 97 wt % Dowlex SC2107 + 3 wt % P-E 1 | Dowlex SC 2107 | Dowlex SC 2107 |
| 11 | 95 wt % Dowlex SC2107 + 5 wt % P-E 1 | Dowlex SC 2107 | Dowlex SC 2107 |
| 12 | 93 wt % Dowlex SC2107 + 7 wt % P-E 1 | Dowlex SC 2107 | Dowlex SC 2107 |
| 13 | 91 wt % Dowlex SC2107 + 9 wt % P-E 1 | Dowlex SC 2107 | Dowlex SC 2107 |

Examples 14-22

Figure 6:
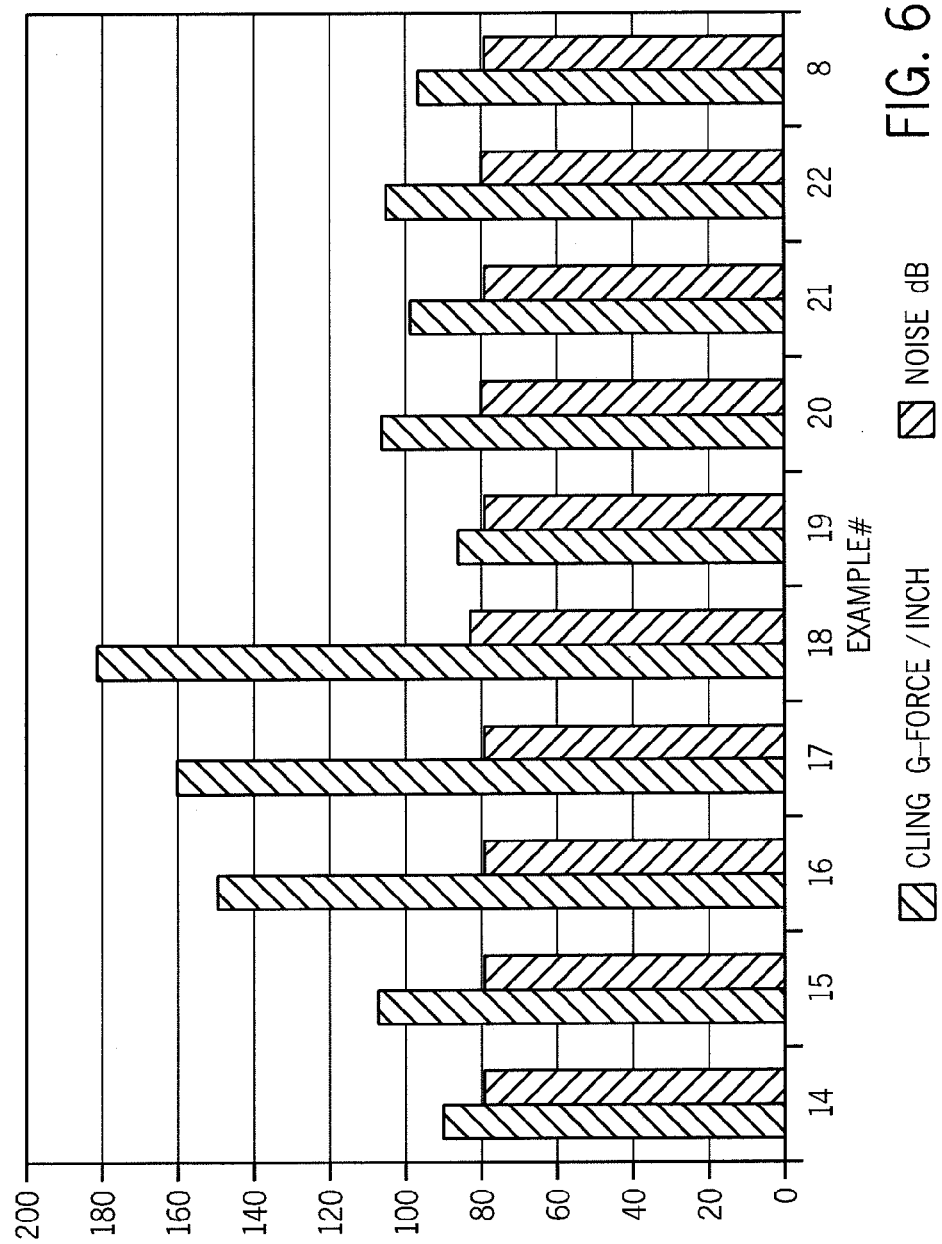
FIG. 6 is a graphical depiction showing the noise and cling levels exhibited by the single-sided stretch cling films of Examples 8, 14 through 22.

Single-sided stretch cling films of Examples 14-22 are made using the same methods described above for the films of Examples 1 and 2. The multilayer single-sided stretch cling films of Examples 14-22 have A/C/B structures as described for the films of Examples 1 and 2, except that the films all have an A/C/B structure having weight ratios of 10 percent/80 percent/10 percent layer thickness ratio for the respective layers. Table 6 sets forth the polymers utilized in the various layers of the film and the respective amounts of each polymer utilized. The cling levels exhibited by cling layer to release layer of the film is determined in accordance with the method described for Examples 1 and 2. The unwinding noise exhibited by the films is determined by the method described for Examples 1 and 2. The cling strength values and unwind noise levels exhibited by the film are depicted in FIG. 6. The tensile strength and other properties listed in Table 1 were not measured for these films, but are expected to be the same or similar to the values measured for Examples 1 and 2.

As can be seen from FIG. 6, when the cling layer makes up less than 13 percent of the film thickness, it is preferable to utilize a propylene-ethylene copolymer having greater than 14 wt % units derived from ethylene, in order to increase the amount of cling exhibited by the film. It can also be seen from FIG. 6, that when the cling layer makes up less than 13 percent of the film thickness, it is preferable to utilize at least 5 percent by weight of the higher ethylene content propylene-ethylene copolymer. For thicker film structures, when the cling layer is 3 microns thick or less, it is preferable to utilize at least 5 percent by weight of propylene-ethylene copolymer having greater than 14 wt % units derived from ethylene.

TABLE 6

| Example | Layer A | Layer B | Layer C |
|---|---|---|---|
| 14 | 99 wt % Dowlex SC2107 + 1 wt % P-E 2 | Dowlex SC 2107 | Dowlex SC 2107 |
| 15 | 97 wt % Dowlex SC2107 + 3 wt % P-E 2 | Dowlex SC 2107 | Dowlex SC 2107 |
| 16 | 95 wt % Dowlex SC2107 + 5 wt % P-E 2 | Dowlex SC 2107 | Dowlex SC 2107 |
| 17 | 93 wt % Dowlex SC2107 + 7 wt % P-E 2 | Dowlex SC 2107 | Dowlex SC 2107 |
| 18 | 91 wt % Dowlex SC2107 + 9 wt % P-E 2 | Dowlex SC 2107 | Dowlex SC 2107 |
| 19 | 99 wt % Dowlex SC2107 + 1 wt % P-E1 | Dowlex SC 2107 | Dowlex SC 2107 |
| 20 | 97 wt % Dowlex SC2107 + 3 wt % P-E 1 | Dowlex SC 2107 | Dowlex SC 2107 |
| 21 | 95 wt % Dowlex SC2107 + 5 wt % P-E 1 | Dowlex SC 2107 | Dowlex SC 2107 |
| 22 | 93 wt % Dowlex SC2107 + 7 wt % P-E 1 | Dowlex SC 2107 | Dowlex SC 2107 |

Examples 23-24

Single-sided stretch cling films of Examples 23 and 24 are made using the same methods described above for the films of Examples 1 and 2. The multilayer single-sided stretch cling films of Examples 23 and 24 have A/C/B structures as described for the films of Examples 1, except that the film of Example 24 has 2 percent by weight of propylene-ethylene copolymer P-E 1 blended into the release layer B. The films were tested for cling layer to release layer cling and unwinding noise as described for the films of Examples 1 and 2. The cling strength values (A-B) and unwind noise levels exhibited by the films are listed in Table 7. The tensile strength and other properties listed in Table 1 were not measured for these films, but are expected to be the same or similar to the values measured for Example 1.

TABLE 7

| Example | (A-B) Cling, g-force/inch | Sound level, db |
|---|---|---|
| 23 | 108 | 75.2 |
| 24 | 175 | 76.6 |

Surprisingly, as can be seen from Table 7, a small amount of propylene-ethylene copolymer added to the release layer enhances the cling properties of the film, without unduly affecting the unwinding noise generated by the film and/or the release properties or the COF of the release layers to one another.

We claim:

1. A single-sided stretch cling film, the film comprising:
   A. a cling layer comprising (1) from 0.1 to 20% by weight of a propylene-based copolymer having substantially isotactic propylene sequences, the propylene-based copolymer comprising propylene and from about 10 to about 33 mole % of units derived from an alpha olefin, the propylene-based copolymer having a melt flow rate less than 50 g/10 min; and (2) from about 80 to about 99% by weight of an ethylene-based copolymer having a density of at least 0.905 g/cc;
   B. a release layer; and
   C. a core layer between the cling layer (A) and the release layer (B);
   wherein the film exhibits cling layer to release layer cling of at least 70 grams force per inch as measured by ASTM D-5458-95, noise levels of less than 87 dB during unwinding operations, and has a modulus of at least 3 MPA as determined by ASTM D-882.

2. The film of claim 1, wherein the propylene-based copolymer exhibits an isotactic triad tacticity level of at least 0.9, comprises from about 9 to about 20 percent by weight of units derived from ethylene, has a melt flow rate of less than 25 g/10 min, and has a crystallinity of at least 2 percent by weight and less than 40 percent by weight, and wherein the film made from the composition exhibits cling of at least 100 grams force per inch.

3. The film of claim 1, wherein the ethylene-based copolymer comprises an ethylene/1-octene copolymer having a density of at least 0.917 g/cc.

4. The film of claim 2, wherein the film exhibits cling of at least 120 grams force per inch.

5. The film of claim 2, wherein the film exhibits cling of at least 150 grams force per inch and noise levels of less than 80 dB during unwind operations.

6. The film of claim 1 comprising:
   A. from 4 to 12% by weight of a propylene-based copolymer having substantially isotactic propylene sequences, the propylene-based copolymer comprising propylene and from about 10 to about 17 wt % of units derived from ethylene, the propylene-based copolymer having a melt flow rate from about 3 to about 18 g/10 min and exhibiting a heat of fusion of less than about 25 Joules/gram; and
   B. from about 88 to about 96% by weight of an ethylene/1-octene copolymer having a density of at least 0.917 g/cc and a melt index of from about 2 to about 12 g/10 min.

7. The film of claim 6, wherein the propylene-based copolymer comprises from about 11 to about 16 percent by weight units derived from ethylene.

8. The film of claim 6, wherein the propylene-based copolymer is polymerized using an activated nonmetallocene, metal centered, heteroaryl ligand catalyst.

9. A method for making a single-sided stretch film comprising:
   coextruding a molten cling layer and a molten release layer,
   A. the cling layer comprising:
      (1) from 0.1 to 20% by weight of a propylene-based copolymer having substantially isotactic propylene sequences, the propylene-based copolymer comprising propylene and from about 10 to about 33 mole % of units derived from an alpha olefin, the propylene-based copolymer having a melt flow rate less than 50 g/10 min; and (2) from about 80 to about 99% by weight of an ethylene-based copolymer having a density of at least 0.905 g/cc; and B. the release layer comprising a polyethylene having a density of at least 0.905 g/cc; and forming a multilayer film exhibiting a cling layer to release layer cling of at least 70 grams force per inch as measured by ASTM D-5458-95.

10. The method of claim 9 comprising forming a multilayer film having a modulus of at least 3 MPa as determined by ASTM D 882.

11. The method of claim 9 comprising forming a multilayer film exhibiting a cling of at least 100 grams force per inch, a noise level of less than 80 dB, and a modulus of at least 6 MPa.

12. The method of claim 9 comprising forming a multilayer film exhibiting a cling of at least 150 grams force per inch, and a modulus of at least 7 MPa.

13. The method of claim 9 comprising adding to the release layer an additive selected from the group consisting of an anti-block additive, a slip additive, a filler, a pigment, a functional additive, an antioxidant, a free-radical scavenger, and a colorant.

14. The method of claim 9 comprising forming a multilayer film having a thickness from about 0.4 mils to about 2 mils.

15. The method of claim 9 comprising coextruding a molten core layer between the molten cling layer and the molten release layer, the core layer comprising a polyethylene; and forming a three-layer film.

16. The method of claim 9 comprising forming a multilayer film wherein the cling of the release layer to itself is less than 60 grams-force/inch.

17. A method comprising:

providing a continuous film roll of a single-sided stretch film comprising a cling layer and a release layer, A. the cling layer comprising:

(1) from 0.1 to 20% by weight of a propylene-based copolymer having substantially isotactic propylene sequences, the propylene-based copolymer comprising propylene and from about 10 to about 33 mole % of units derived from an alpha olefin, the propylene-based copolymer having a melt flow rate less than 50 g/10 min; and (2) from about 80 to about 99% by weight of an ethylene-based copolymer having a density of at least 0.905 g/cc; and B. the release layer comprising a polyethylene having a density of at least 0.905 g/cc; and unwinding the single-sided stretch film at a noise level of less than 87 dB.

18. The method of claim 17 comprising unwinding the single-sided stretch film at a noise level of less than 80 dB.

19. The method of claim 17 comprising applying the film to a pallet load;

rotating the pallet load; and overwrapping pallet load with the film.

20. The method of claim 17 comprising wrapping the single-sided stretch film around an object selected from the group consisting of a silage bale, a metal reel, a paper reel, cardboard, a plastic tray, a wood profile, a plastic profile, and a metal profile.

* * * * *